United States Patent [19]
Folkert

[11] 3,908,476
[45] Sept. 30, 1975

[54] BELT DRIVE AND TENSIONING APPARATUS

[75] Inventor: Henry Folkert, Granger, Wash.

[73] Assignee: Folkert, Inc., Granger, Wash.

[22] Filed: Sept. 30, 1974

[21] Appl. No.: 510,541

Related U.S. Application Data

[62] Division of Ser. No. 404,188, Oct. 9, 1973, Pat. No. 3,853,018.

[52] U.S. Cl. .................. 74/242.11 A; 74/242.14 R
[51] Int. Cl.² .......................... F16H 7/12; F16H 7/10
[58] Field of Search ............ 74/242.11 A, 242.14 R, 74/219

[56] References Cited
UNITED STATES PATENTS
1,173,886  2/1916  Sorokin.................... 74/242.11 A X
1,854,018  4/1932  Carlberg.................. 74/242.14 R X
3,813,956  6/1974  Whitecar ............................. 74/219

*Primary Examiner*—Leonard H. Gerin
*Attorney, Agent, or Firm*—Marvin E. Jacobs

[57] ABSTRACT

A compact, multi-step belt drive transmission is disclosed which utilizes only a single pair of shafts. To provide automatic belt tensioning, the transmission is designed whereby all belts are of uniform size and tension, one of the shafts is spring biased to provide proper belt tension when the transmission is at rest, and a novel locking arrangement maintains the shaft in the position it was at at rest, when the transmission is operative.

5 Claims, 6 Drawing Figures

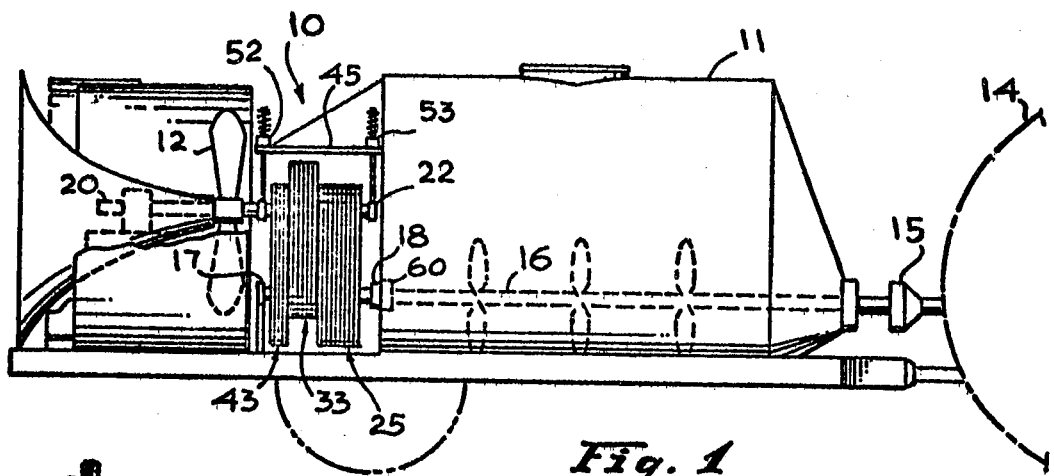
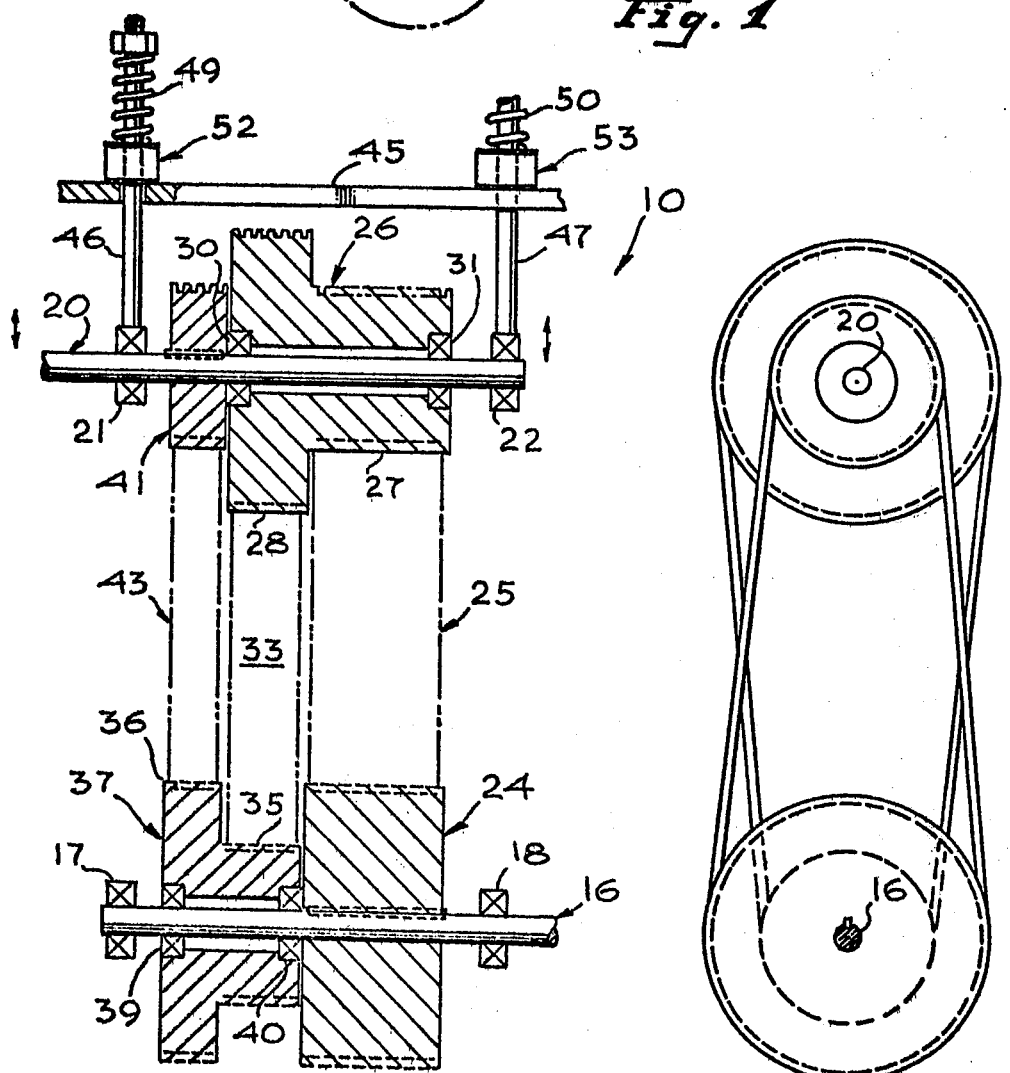
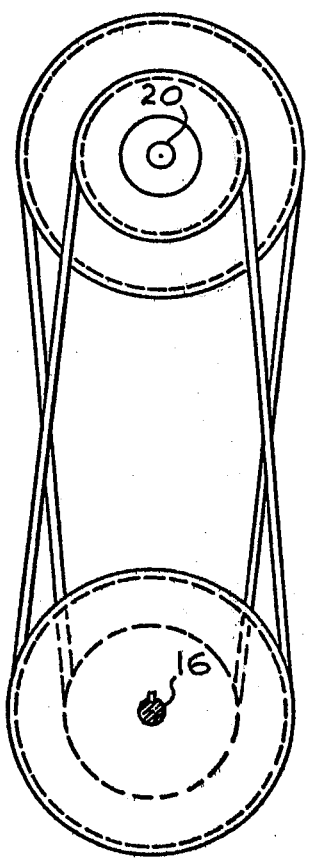

BELT DRIVE AND TENSIONING APPARATUS

CROSS REFERENCE TO RELATED APPLICATION

This application is a division of application Serial No. 404,188, filed Oct. 9, 1973, now U.S. Pat. No. 3,853,018.

BACKGROUND OF THE INVENTION

1. Field of the Invention

The present invention relates generally to belt-driven power transmissions and, more particularly, to an improved, compact, belt drive apparatus in which proper belt tension is automatically maintained during all speed and load conditions.

2. History of the Prior Art

Belt-driven transmissions are one of the most widely used methods of transmitting rotational power from one shaft to another and for obtaining a mechanical advantage or speed increase or reduction. Although the wide use of belt drives is a result of their relative simplicity and low cost, there are several problems encountered when utilizing them in a situation where a large amount of power is being transmitted and a sizeable step-up or step-down ratio is desired.

One problem is one of size since a conventional step belt drive arrangement requires a large array of shafts, bearings, pulleys and supports to accomplish a large ratio step-up or step-down.

Another problem is one of maintaining proper belt tension since under heavy loadings or high speeds incorrect tension results in excessive belt wear and premature failure and in the case of insufficient tension, undesired slippage.

While the prior art contains many solutions to the aforestated problems including elaborate tensioning arrangements, variable length belts, belt dressings, and the like, problems of effectiveness, cost, size and reliability are found to be present in approaches of this type.

SUMMARY OF THE INVENTION

Accordingly, it is the general aim of the present invention to provide an improved belt drive apparatus which is capable of transmitting a sizeable power input through a large ratio step-up or step-down in a compact area while automatically maintaining proper tension on the belts.

It is another object of the invention to provide a relatively low-cost belt drive apparatus which is extremely reliable in operation and enjoys a greater belt life expectancy than do conventional belt drives. A related object of the invention is to provide an improved belt drive apparatus which can be readily disassembled for belt replacement and which utilizes a matched set of belts thereby eliminating the necessity of stocking a large array of spare belts of different sizes.

While the present invention is concerned with providing a compact, belt-drive apparatus with automatic belt tensioning, it is nevertheless an object of the invention to provide an improved apparatus from all aspects. In this connection, it is a further object of the invention to provide an improved shaft bearing and seal which can be readily positioned to properly locate and align a supportive, rotating shaft of the belt drive.

BRIEF DESCRIPTION OF THE DRAWINGS

The above stated and other objects and advantages of the instant invention will readily appear from the following description taken in conjunction with the accompanying drawings in which:

FIG. 1 is a side elevation of an exemplary belt drive apparatus embodying the features of the present invention, here shown used to drive a fan on a tractor-pulled farming vehicle;

FIG. 2 is a side sectional view of the belt drive apparatus shown in FIG. 1;

FIG. 3 is an end view of the pulley and belt arrangement of the belt drive apparatus shown in FIG. 1;

Figure 4:
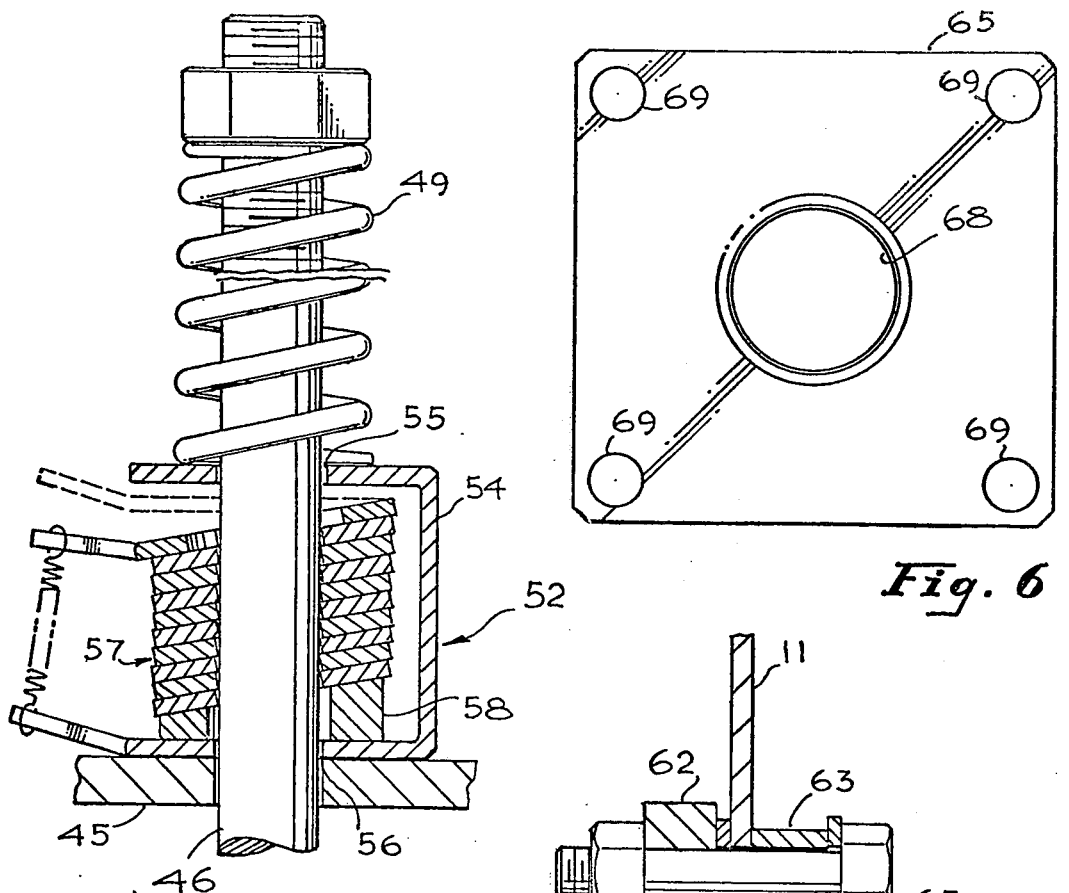
FIG. 4 is a side view of the automatic belt tensioning portion of the belt drive apparatus shown in FIG. 1, with portions thereof shown in section.

While the present invention is susceptible of various modifications and alternative constructions, the illustrative embodiment shown in the drawings will herein be described in detail. It should be understood, however, that it is not intended to limit the invention to the particular forms disclosed, but, on the contrary, the intention is to cover all modifications, equivalents and alternative constructions falling within the spirit and scope of the invention as expressed in the appended claims.

DESCRIPTION OF THE PREFERRED EMBODIMENTS

Referring now to FIG. 1 through 3, the exemplary belt drive apparatus, generally indicated at 10, is illustrated mounted and in use on a farm vehicle 11 to drive a high velocity fan 12. The vehicle 11 is of the type which is pulled by a tractor 14 and the power input to the belt drive is provided by a conventional power take-off 15 from the tractor 14.

In accordance with one of the important aspects of the present invention, the belt drive 10, while in the illustrated embodiment has three step-ups, is extremely compact. This is accomplished by utilizing only a single pair of shafts, an input shaft 16 which is journaled on bearings 17 and 18 and connected to the power take-off 15 of the tractor, and an output shaft 20 which is journaled on bearings 21 and 22.

To provide three step-ups between a simple pair of shafts, a first pulley 24 is affixedly mounted to the input shaft 16 by any one of the conventional methods such as a keyway or spline and driven pulley 26 through a first set of belts 25 which connect pulley 24 to the smaller diameter portion 27 of pulley 26. As shown in FIG. 2, pulley 26 which has a driven portion 27 and a layer diameter driving portion 28 is mounted on output shaft 20 so as to be able to rotate on bearings 30 and 31 independently of shaft 20.

A second belt set 33 is utilized to connect pulley 26 to the smaller diameter portion 35 of pulley 37 which is independently mounted on input shaft 16 bearings 39 and 40. The larger portion 36 of pulley 37 is connected to and drives pulley 41 which is affixedly mounted to output shaft 20 through a third set of belts 43. Thus, by independently mounting pulleys 26 and 37 on shafts 20 and 16, respectively, three step-ups can be accomplished between two shafts along with arranging all the pulleys at one end of the belt on a common shaft which, as hereinafter set forth, is utilized in the instant invention for belt tensioning purposes.

To further reduce the space required for the belt drive 10 and to reduce cost, it has been found that in a step-up arrangement where higher rpm is obtained, the load on each successive step-up belt is less and accordingly, if the number of belts in each successive set is decreased inversely proportional to the belt speed as diagrammatically depicted in FIG. 2, the tension in each belt in each set 25, 33 and 43 is equal. Furthermore, if the smaller diameter sections 35 and 27 and layer diameter sections 36 and 28 of pulleys 37 and 26, respectively, are of equal diameter and correspond to the diameter of pulleys 24 and 41, all the belts in sets 25, 33 and 43 will be of equal length and be maintained in operation in uniform tension.

In accordance with another important aspect of the present invention, provision is made for automatically maintaining proper tension in all of the belts in sets 25, 33 and 43. To accomplish this, the hereinbefore described arrangement whereby all belts are in uniform tension and all the pulleys at each end of all sets of the belts are on a common shaft, is made use of. Referring particularly to FIGS. 2 and 4, the bearings 21 and 22 which journey output shaft 20 are mounted to the frame 45 of the vehicle 11 by shafts 46 and 47 which are spring loaded by springs 49 and 50, respectively. The force required to compress springs 49 and 50 is selected whereby when the belt drive apparatus is not running, the springs will pull shaft 20 upward whereby the belts in sets 25, 33 and 43 are all in proper tension. The springs however are of a strength that will permit shaft 20 to be pulled downwardly upon power being applied to the belt drive which results in an increase in belt tension.

In order to prevent shaft 20 from being pulled downwardly upon actuation of the belt drive, thereby relaxing the proper tension in the belts, locking mechanisms generally indicated at 52 and 53 are provided on each of the shafts 46 and 47. As shown in FIG. 4, locking mechanisms 52 like its counterpart 53 includes a housing 54 which abuts frame 45 and has upper and lower openings 55 and 56 through which the shaft 46 can freely move. Within the housing 54 is a stack of washers 57 through which the shaft 46 passes. A wedge member 58 through which shaft 46 also passes is located at the bottom of the stack of washers to maintain each washer therein at a predetermined angular relationship with shaft 46. Thus, by properly sizing the holes in the washers through which shaft 46 passes, when the shaft 46 moves downwardly, the washers collectively wedge the shaft into a locked position preventing downward movement.

When the belt drive is not running, the shaft 46 is drawn upwardly due to spring 49 and the stack of washers 57 is moved up thereby to a horizontal position as shown in broken lines which permits shaft 46 to be drawn up to where correct belt tension is restored. It is understood that locking mechanism 53 functions simultaneously with respect to shaft 47.

Figure 6:
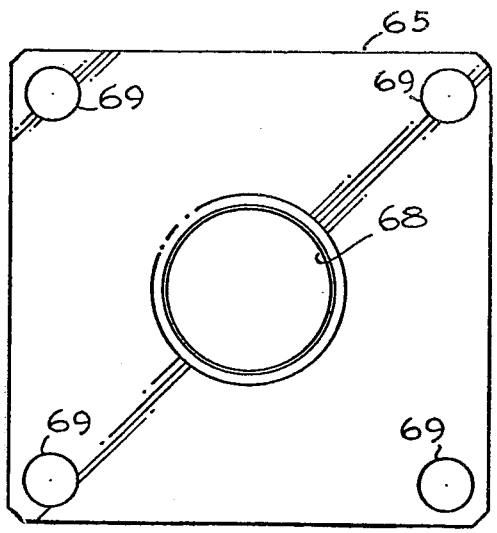
FIG. 6 is a view of the hole placement for mounting the bearing and seal shown in FIG. 5 on a planar surface.
Figure 5:
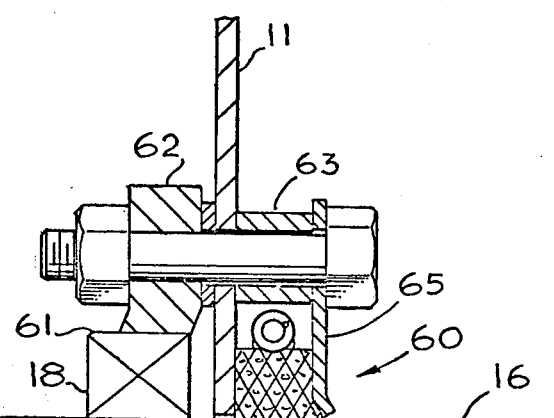
FIG. 5 is a side sectional view of an improved shaft bearing and seal used with the present invention.

Turning next to FIGS. 5 and 6, there is shown shaft bearing seal 60 which finds use with the present invention. As can be readily appreciated, proper alignment of both shafts 16 and 20 are necessary for the proper operation the belt drive and the automatic tensioning. In order to accurately locate a bearing in a planar portion of a frame, housing or the like, the customary practice is to provide a seat or bushing for the bearing and seal and the installation of a seat requires time-consuming operation such as cutting and welding. large holes required for such a seat are difficult to locate accurately. In the instant bearing seal 60, the housing 61 of the bearing 18 is provided with four ears 62 which correspond to four spacers 63 extending from the housing 65 which holds the shaft seal 67 which can be a braided packing retained by means of a spring 70. Accordingly, as shown in FIG. 6, to install the bearing seal 60 in a planar frame member, for example, one would only have to provide a hole 68 slightly larger than the shaft 16 to be journaled, and four smaller holes 69 through which each of the respective corresponding ears 62 and spacers 63 can be fastened together.

What is claimed is:

1. An automatic belt tensioner for a compact belt drive transmission in which a first shaft rotatably journaled by first support means affixed to a frame means fixedly carries a first belt pulley and a second shaft rotatably journaled by second support means and disposed in a spaced and generally parallel relationship to said first shaft fixedly carries a second belt pulley and belt means operatively connects said pulleys, said tensioner comprising:

at least one elongated member for attaching said second support means to said frame means in a generally planar alignment with said belt means and extending in an opposite direction thereto;

spring bias means affixed to said elongated member and urging said member upwardly with a force sufficient to maintain proper tension on said belt means irrespective of wear and stretching of said belt means when the transmission is at rest; and stop means cooperatively engaging said elongated member preventing said member from moving downward when the transmission is operative and a downward force greater than the force of said spring bias means is applied to said second shaft.

2. The belt tensioner as set forth in claim 1 wherein said elongated member includes a generally round section and said stop means comprises a plurality of stacked, angularly disposed washers which said round section of said elongated member passes through with a clearance between said round portion and the hole in each washer in said plurality, whereby upon a downward movement of said elongated member, said plurality of washers collectively grip said round portion and upon an upward movement of said elongated member, said plurality of washers release the grip, and said plurality of stacked, angularly disposed washers disposed so as to be fixedly maintained with respect to said frame means to prevent downward movement of said elongated member when gripping same.

3. The belt tensioner according to claim 2 further including a housing for abutting said support means and having upper and lower openings through which the elongated member passes and can freely move therethrough.

4. The belt tensioner according to claim 3 further including an apertured wedge member through which said elongated member freely passes for disposing said stack of washers angularly.

5. The belt tensioner according to claim 4 in which the spring bias means surrounds said elongated member and is fixedly restrained between said housing and an end of said elongated member.

* * * * *